May 8, 1962 R. R. ATHERTON 3,033,996

VOLTAGE COMPARATOR HAVING PULSE GENERATOR OPERATIVE WHEN INPUT VOLTAGE BACK-BIASES COMPARISON DIODE

Filed Nov. 15, 1960

INVENTOR.
ROBERT R. ATHERTON

BY

H. H. Losche

ATTORNEYS 3,033,996

VOLTAGE COMPARATOR HAVING PULSE GENERATOR OPERATIVE WHEN INPUT VOLTAGE BACK-BIASES COMPARISON DIODE

Robert R. Atherton, Indianapolis, Ind., assignor to the United States of America as represented by the Secretary of the Navy Filed Nov. 15, 1960, Ser. No. 69,530
5 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor The present invention relates generally to voltage comparison devices and more particularly to a device for delivering a positive pulse to a load when an input or trigger voltage becomes equal to a reference voltage.

Those concerned with the development of comparison devices for supplying an indication of the equality of two or more voltages have long recognized the need for such a unit which would have a very low power loss, be comparatively small in size, and provide an output only when the voltages to be compared are exactly equal, i.e., possess high sensitivity. The present invention fulfills this need. Units of the prior art, because of extensive power losses, have included one or more amplifier stages to provide a pulse of sufficient power. Previous devices have been relatively insensitive to slight changes in the voltages to be compared and have possessed inaccuracies due to a lack of, or to unbalanced, temperature compensation of the comparison elements.

The present invention overcomes these disadvantages of the prior art by utilizing novel circuitry to provide a unit for supplying a high-energy, short-duration pulse obtained from low level comparator transistors to a load without the need for a power amplifier stage when an input voltage is exactly equal to a voltage established at a desired level by a reference element. The circuit is constructed in such a manner as to provide balanced temperature compensation for the matched comparison transistors through emitter-to-emitter coupling action. The quiescent current and dissipation of these comparison transistors are extremely low, thus permitting the use of low level transistors which have been proven to be better qualified for comparator applications than higher power units. A typical application in which the invention might be utilized is set forth in the inventor's co-pending application entitled "Shunt Regulating Charging Circuit," Serial Number 97,115, filed March 20, 1961, wherein it may be employed as block 31 in FIGURE 1 thereof.

An object of the present invention is the provision of a comparison device to deliver a positive pulse to a load when two voltages become equal.

Another object is to provide a unit for delivering a positive pulse to a load when an input voltage is precisely equal to a reference voltage.

A further object of the invention is to provide a comparison device utilizing circuitry having a minimum of quiescent dissipation.

Still another object is to provide a comparison unit having a high sensitivity to slight changes in the voltages to be compared.

Yet another object of the present invention is the provision of comparison circuitry possessing balanced temperature compensation.

A still further object is to provide a comparison circuit utilizing low level transistors as comparator elements.

Other objects and features of the invention will become apparent to those skilled in the art as the disclosure is revealed in the following detailed description of a preferred embodiment of the invention as illustrated in the accompanying sheet of drawing in which:

FIGURE 2(*b*) shows the corresponding output pulses which occur when the increasing input signals become equal to the reference potential.

Figure 1:
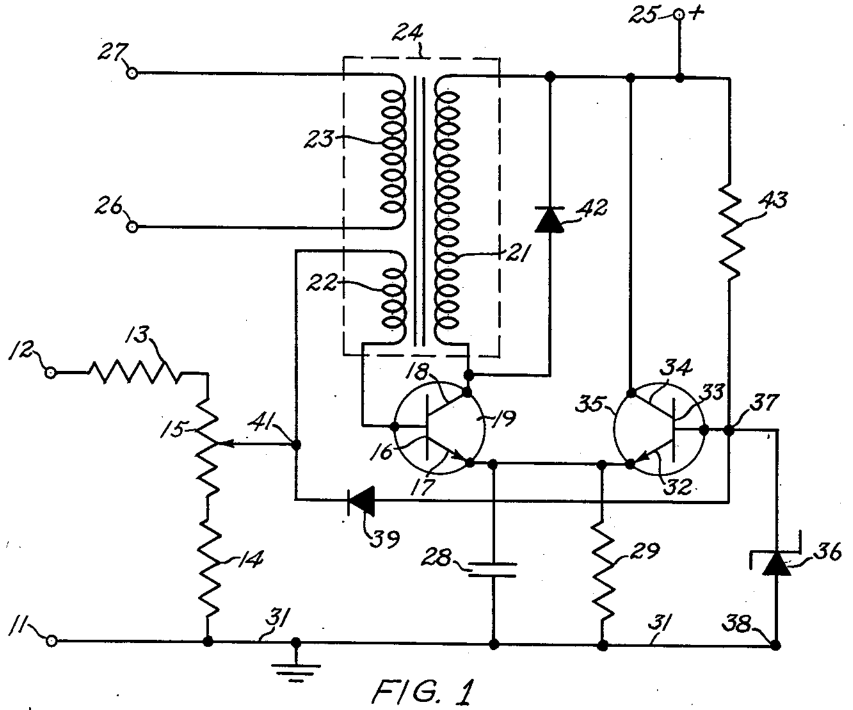
FIGURE 1 is a schematic diagram of a preferred form of the invention.

Referring now to FIGURE 1, there is shown a specific embodiment of the invention in which terminals 11 and 12 are provided for coupling to a source of varying input voltage which is to be compared to a reference voltage. Resistors 13 and 14, and potentiometer 15 form a voltage divider arrangement for applying a portion of the input voltage across base 16 and emitter 17 of a comparator-oscillator transistor 19 which has a collector 18 coupled through primary winding 21 of transformer 24 to a source of positive direct current potential 25. Transformer 24 has, in addition to primary winding 21, an output winding 23 for supplying a pulse to output terminals 26 and 27, and a feedback winding 22 coupled in series between the variable arm of potentiometer 15 and base 16 of transistor 19 for providing regenerative feedback from collector 18 to base 16. Emitter 17 of transistor 19 is coupled directly to emitter 32 of comparator transistor 35, and also through the parallel combination of capacitance 28 and resistance 29 to ground lead 31. Transistor 35 has a collector 34 coupled directly to positive direct current source 25, and a base 33 coupled to the positive terminal 37 of voltage reference zener diode 36 whose negative terminal 38 is coupled to ground through lead 31. Diode 39 is coupled between positive terminal 37 of zener diode 36 and terminal 41 of feedback winding 22 of transformer 24 in order to provide a low impedance return path through diodes 36 and 39 for the regeneration current, and also to protect transistor 19 form excess back bias.

Diode 42 is coupled in parallel with primary winding 21 of transformer 24 to protect collector 18 from reverse voltage breakdown. Resistance 43 is coupled from positive direct current source 25 to positive terminal 37 of zener diode 36 to supply diode 36 with a constant current from source 25.

Figures 2A, 2B:
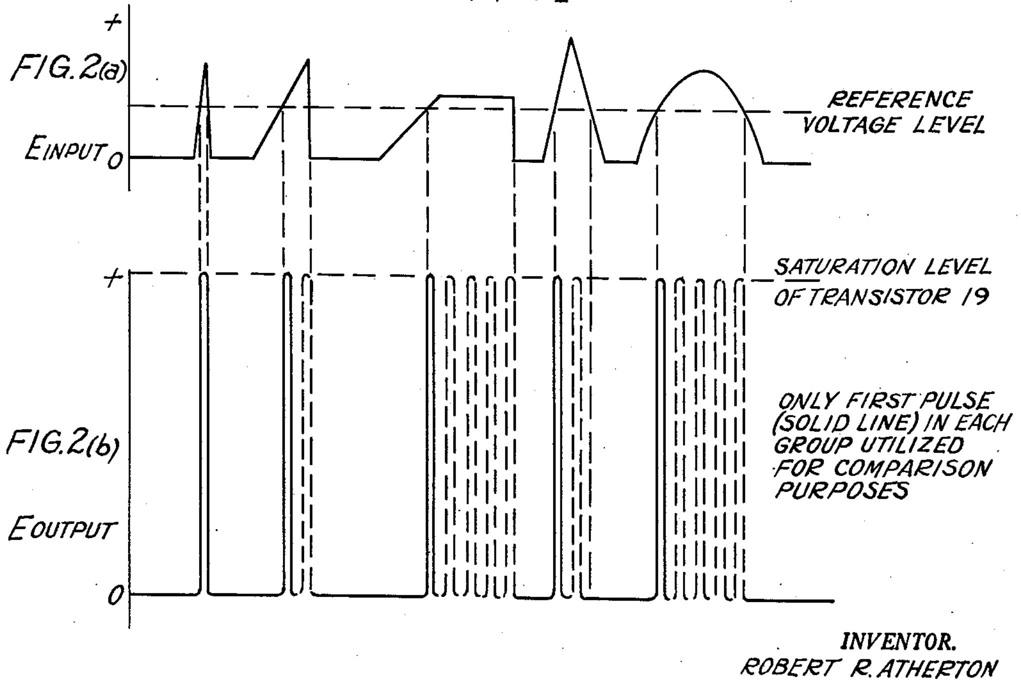
FIGURE 2(*a*) shows a few of the various types and shapes of input waveforms which may be applied to the invention for comparison with the reference potential.

FIGURE 2(*a*) shows a few of the various types and shapes of input waveforms which might be applied to input terminals 11 and 12 of FIGURE 1, and FIGURE 2(*b*) depicts the corresponding high power, short duration type of output pulses which would be supplied to output terminals 26 and 27 by the invention during the short period of conduction of transistor 19.

The operation of the invention is as follows:

Positive source 25 provides a constant direct current through resistance 43 to voltage reference zener diode 36. This current flows through diode 36 to ground via lead 31 and is thereby returned to source 25. The constant potential established across diode 36 is utilized as the reference voltage to which the desired portion of the input voltage is compared. This reference potential is placed across transistor 35 by coupling positive terminal 37 of zener diode 36 to base 33, and negative terminal 38 of diode 36 via lead 31 and through resistance 29 to emitter 32 of transistor 35 and emitter 17 of transistor 19 in a common emiter arrangement. This common emitter coupling of matched transistors 19 and 35 provides a balanced arrangement in which any increase or decrease in voltage across the emitter-base junction of either transistor due to variation in the ambient temperature will be accompanied by a compensating increase or decrease in voltage across the emitter-base junction of the other, whereby the effect of these voltage variations on the comparison function of the invention will be nullified. Collector voltage is supplied from positive direct current source 25 directly to collector 34 of transistor 35, and to collector 18 of transistor 19 via primary winding 21 of transformer 24.

With no input or trigger voltage present on input terminals 11 and 12, transistor 19 will be nonconducting, and with B+ voltage from source 25 on collector 34 and the zener reference voltage from diode 36 across base 33 and emitter 32, transistor 35 will be in a state of conduction; thus currrent will flow from source 25 to collector 34, through base 33 to emitter 32, and through resistance 29 to ground. Due to this flow of current through transistor 35, there is practically no difference in potential between the terminals of emitter 32 and base 33. Therefore, during conduction of transistor 35, the difference in potential between common emitters 32 and 17, and ground will be for all practical purposes equal to the zener reference voltage established across diode 36.

With no input signal applied to terminals 11 and 12, base 16 of transistor 19 would be at ground potential and emitter 17 would be at the positive direct current potential of base 33 due to the conduction of transistor 35. This difference in potential between base 16 and emitter 17 would represent a back bias or inverse voltage across transistor 19 which could cause it to break down in the reverse direction except for diode 39. Diode 39, coupled to positive terminal 37 of reference diode 36 and to terminal 41 of base feedback winding 22, is forward biased when no input signal is present, and protects transistor 19 from this damaging inverse voltage by providing a positive potential, slightly less than that present at emitter 17, to base 16 so that no damaging inverse potential difference exists between emitter 17 and base 16. When a positively increasing input signal such as that shown in FIGURE 2($a$) is applied to input terminals 11 and 12, a reverse bias is applied to diode 39 which increases with the input signal and this bias tends to place diode 39 in an increasingly higher impedance state so that prior to the time when the input signal would cause transistor 19 to conduct, this reverse bias makes diode 39 appear open circuited and thus it has no effect on the point at which transistor 19 begins conduction.

When an input signal is presented to terminals 11 and 12, potentiometer 15 is adjusted to provide a desired portion of this voltage to base 16 of transistor 19 for comparison with the reference voltage established by zener diode 36. So long as the potential of the portion of the input signal to be compared remains below the potential of the zener reference voltage, transistor 19 will remain cut off and transistor 35 will be in its normally conducting state; however, when an increasing input or trigger signal causes the potential on base 16 to become equal to the reference potential on base 33, transistor 19 will immediately begin conduction indicating that the portion of the input signal applied to transistor 19 through potentiometer 15 has become equal to the zener reference potential. The increasing level of conduction of transistor 19 (due to regeneration) causes common emitters 17 and 32 to become more and more positive, and since the potential at base 33 (zener reference potential) remains constant, transistor 35 is thereby cut off, this action being similar to that of a differential amplifier.

When transistor 19 begins conduction a current flows in the primary winding 21 of transformer 24, and during the period that the input signal is increasing, a component of this current will be increasing and will induce voltages in regenerative feedback winding 22 and output winding 23. The regeneration voltage induced in winding 22 causes a regeneration current to flow from winding 22 through base 16 and emitter 17, through bypass capacitor 28, which appears as a short circuit to this very rapidly increasing regeneration current and thus enables the invention to provide a high energy output pulse to winding 23, to grounded lead 31 and then back to winding 22 through a low impedance return path composed of diode 36 which has a low dynamic impedance and diode 39 which during regeneration is forward biased. Without this novel low impedance diode return path, the regeneration current would be forced to flow back to winding 22 through the higher impedance path consisting of resistance 14 and potentiometer 15 which would reduce the regeneration loop again. This regeneration current increases conduction through transistor 19 which increases the amplitude of the voltage induced in feedback winding 22 and output winding 23 until transistor 19 reaches saturation. At this point, the rate of change of collector current of transistor 19 becomes zero $$\left(\frac{di_c}{dt}=0\right)$$

and hence the induced voltages in windings 22 and 23 vanish and saturation of the transistor can no longer be sustained. Transistor 19 then comes out of saturation and in so doing causes the collector current to decrease, thus inducing voltages in windings 22 and 23 of a polarity opposite to that during buildup. This reversing process is also regenerative and thus transistor 19 regenerates back to its initial condition of nonconduction which, through differential action, returns transistor 35 to its normally conducting state, thus preparing the circuit for another input comparison signal.

One of the primary functions of this preferred embodiment of the invention is to produce an output pulse at terminals 26 and 27 of the type shown in FIGURE 2($b$), having very short duration and high power at precisely the moment when the portion of a rapidly increasing input trigger signal applied to base 16 becomes equal to the positive reference potential established by zener reference diode 36. This is accomplished by applying an input or trigger signal train of any of the pulse types shown in FIGURE 2($a$) to input terminals 11 and 12. This signal is passed through potentiometer 15 and feedback winding 22 of transformer 24 to base 16 of transistor 19 which is in its normal state of nonconduction; when this increasing input or trigger signal reaches the level of the zener reference voltage, transistor 19 will begin conduction and transistor 35 will be cut off by the previously-explained differential action of common emitters 17 and 32. As soon as transistor 19 begins conduction, regeneration occurs as previously pointed out and the large regeneration current causes winding 21 to induce a pulse of the desired type shown in FIGURE 2($b$) in output winding 23. As shown by FIGURE 2, the production of a series of output pulses at terminals 26 and 27 will result from a single input signal whose amplitude remains above the reference voltage level after the initial output pulse; however, when an input signal of this type is utilized, the external load coupled to terminals 26 and 27 is constructed in such a manner so as either to accept only the first output pulse of such a series (represented by solid line in FIGURE 2($b$)) as being indicative of the equality of the input signal and the reference signal, or to remove the input signal from terminals 11 and 12 upon receipt of the first such output pulse, thereby eliminating all succeeding pulses (shown by broken lines in FIGURE 2($b$)). Since the voltage across winding 21 returns to zero very rapidly after transistor 19 reaches saturation, diode 42 is placed across this winding to protect transistor 19 from collector voltage breakdown due to the possibility of overshoot as this voltage returns. When transistor 19 ceases conduction, the comparison cycle is completed, transistor 35 resumes its normally conducting state, and the circuit awaits the next input signal.

Thus it becomes apparent from the foregoing description and annexed drawing that the disclosed invention, an accurate, highly sensitive voltage comparing pulse generator, is a useful and practical device having many applications, both industrial and military, in the field of electronics. The high degree of accuracy attainable in the comparison of voltages with this device is due in large measure to the utilization of a differential method of coupling the emitters of the matched comparator transistors so that any inaccuracy caused by the temperature sensitivity of one transistor will be compensated for by the other. The usefulness of this invention is enhanced by its ability to provide a useable, high power, comparison indicating pulse to a load without the necessity of incorporating an additional power amplifier stage.

Obviously many modifications and variations of the present invention are possible in the light of the above teachings. It is therefore to be understood that within the scope of the appended claims, the invention may be practiced otherwise than as specifically described.

What is claimed is:

1. A voltage amplitude comparison circuit comprising: first and second electronic comparison elements, each having an input electrode and first and second conduction electrodes, said first element having a source of reference voltage coupled to its input electrode and said second element having a terminal means coupled to its input electrode for receiving a signal voltage to be compared with said reference voltage, said first element having its first conduction electrode coupled directly to a source of positive direct current potential and having its second conduction electrode coupled in common with the second conduction electrode of said second element and through an impedance comprised of a capacitance and a resistance coupled in parallel to ground potential, said capacitance providing a direct, low impedance path to ground for the regeneration current of said second element; voltage transforming means having an input winding with a first terminal coupled to said source of positive direct current potential and a second terminal coupled to said first conduction electrode of said second element, an output winding for providing a pulse of voltage to a load to indicate equality of said reference voltage and said signal voltage to be compared, and a third winding coupled between said input electrode and said terminal means of said second element to return or feed back energy from the first conduction electrode circuit thereof to the input electrode for the purpose of regeneration in said second element; and a diode means coupled between the input electrode of said first element and said terminal means of said second element, said diode means having its direction of least resistance from said first element toward said second element for providing in conjunction with other means, a low impedance return path from ground to said third winding of said voltage transforming means in order that said second element may provide high gain, and also for providing protection from damaging reverse bias which might otherwise exist between electrodes of said second element.

2. A voltage amplitude comparison circuit in accordance with claim 1 wherein said source of reference voltage includes a zener or avalanche diode for developing a constant reference potential, and said first and second elements are transistors in which said input electrode is a base, said first conduction electrode is a collector, and said second conduction electrode is an emitter.

3. A voltage comparison pulse generator circuit comprising: first and second transistor comparison elements, each having a base, a collector, and an emitter electrode, said first transistor element having a source of reference voltage coupled to its base electrode and said second transistor element having a terminal means coupled to its base electrode for receiving a signal voltage to be compared with said reference voltage, said first transistor element having its collector electrode coupled directly to a source of positive direct current potential and having its emitter electrode coupled in common with the emitter electrode of said second transistor element and through an impedance comprised of capacitance and a resistance coupled in parallel to ground potential, said capacitance providing a direct, low impedance path to ground for the regeneration current of said second transistor element; voltage transforming means having an input winding with a first terminal coupled to said source of positive direct current potential and a second terminal coupled to said collector electrode of said second transistor element, an output winding for providing a pulse of voltage to a load to indicate equality of said reference voltage and said signal voltage to be compared, and a third winding coupled between said base electrode and said terminal means of said second transistor element to return or feed back energy from the collector electrode circuit thereof to the base electrode for the purpose of regeneration in said second transistor element; and a diode means coupled between the base electrode of said first transistor element and said terminal means of said second transistor element, said diode means having its direction of least resistance from said first transistor element toward said second transistor element for providing, in conjunction with other means, a low impedance return path from ground to said third winding of said voltage transforming means in order that said second transistor element may provide high gain, and also for protecting said second transistor element from damaging reverse bias which might otherwise exist between its emitter and base electrodes.

4. A voltage comparison pulse generator circuit in accordance with claim 3 wherein said source of reference voltage includes a zener or avalanche diode for developing a constant reference potential, and said terminal means includes voltage dividing means coupled so that some portion of said signal to be compared may be applied to said second transistor element.

5. A voltage comparison pulse generator circuit comprising: first and second transistor comparison elements, each having a base, a collector, and an emitter electrode, said first transistor element having a source of reference voltage coupled to its base electrode and said second transistor element having a terminal means including a voltage divider coupled to its base electrode for receiving a signal to be compared with said reference voltage, said first transistor element having its collector electrode coupled directly to a source of positive direct current potential, and having its emitter electrode coupled in common with the emitter electrode of said second transistor element and through an impedance comprising a capacitance and a resistance in parallel to ground potential; voltage transforming means having input, feedback, and output windings for providing a pulse of voltage to a load to indicate equality of said reference voltage and said signal to be compared, said input winding having a first terminal coupled to said source of positive direct current potential and a second terminal coupled to said collector electrode of said second transistor element, and said feedback winding coupled between said base electrode and said terminal means of said second transistor element to return or feed back energy from the collector electrode circuit to the base electrode for the purpose of regeneration in said second transistor element; and a diode means coupled between the base electrode of said first transistor element and the terminal of said feedback winding nearest said terminal means of said second transistor element, said diode means having its direction of least resistance from said first transistor element toward said second transistor element for providing, in conjunction with other means, a low impedance return path from ground to said feedback winding of said voltage transforming means in order that said second transistor element may provide high gain, and also for protecting said second transistor element from damaging reverse bias which might otherwise exist between its emitter and base electrodes.

References Cited in the file of this patent

UNITED STATES PATENTS 2,956,177 Day -------------------- Oct. 11, 1960